Aug. 10, 1937.                H. M. ROGERS                2,089,815
                                TRAILER
                         Filed March 18, 1935          2 Sheets-Sheet 1

Inventor
Harvy M. Rogers
By
Hardway Cathey
Attorney.

Aug. 10, 1937.   H. M. ROGERS   2,089,815
TRAILER
Filed March 18, 1935   2 Sheets-Sheet 2

Inventor
Harvy M. Rogers
By
Hardway Cathey
Attorneys

Patented Aug. 10, 1937

2,089,815

UNITED STATES PATENT OFFICE 2,089,815

TRAILER

Harvy M. Rogers, Fisher, La., assignor of one-half to W. A. Herrington, Many, La.

Application March 18, 1935, Serial No. 11,622

4 Claims. (Cl. 280—33.4)

This invention relates to a trailer.

An object of the invention is to provide a trailer of the character described comprising upper and lower assemblies, with novel means for connecting the assemblies whereby they will have the required relative vertical movement.

Another object of the invention is to provide novel means for mounting the upper assembly yieldingly on the lower assembly.

A still further object is to provide a novel means for connecting the trailer to the coupling pole through which the trailer is connected to the draft vehicle in front.

With the above and other objects in view, this invention has particular relation to certain novel features of construction, operation, and arrangement of parts, an example of which is given in this specification and illustrated in the accompanying drawings, wherein:—

Figure 1:
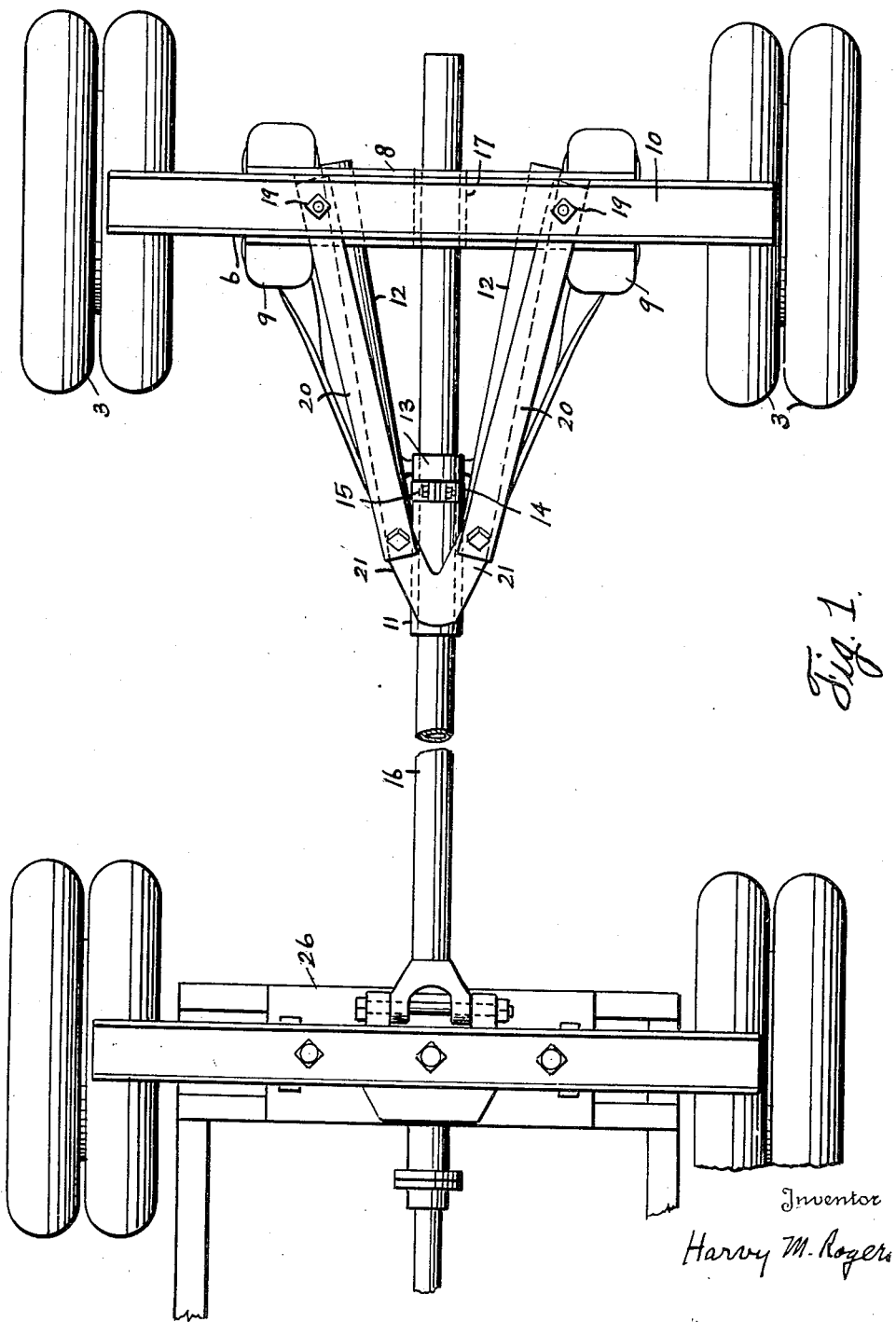
Figure 1 shows a plan view of the trailer showing the means for connecting it to the draft vehicle.
Figure 2:
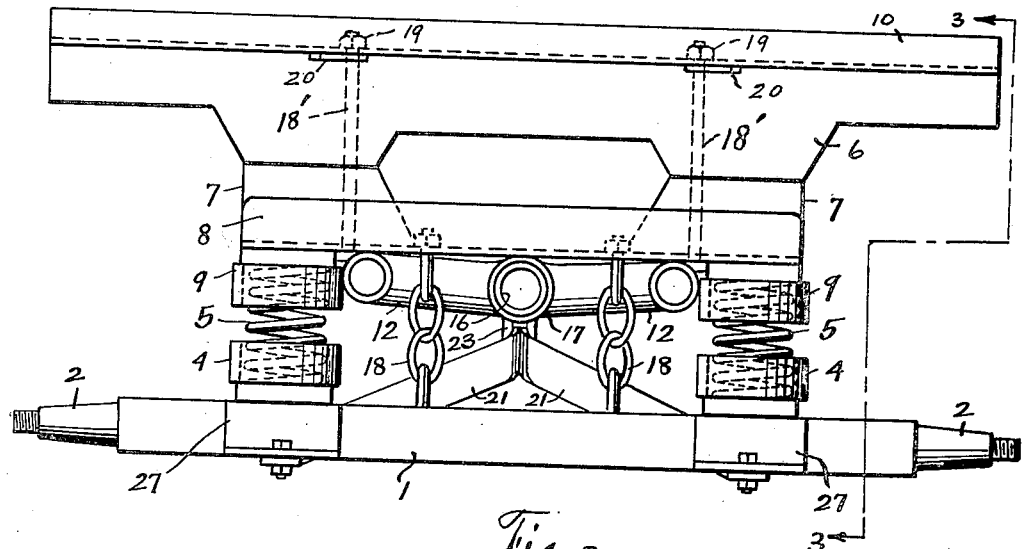
Figure 2 shows a rear elevation of the trailer showing the ground wheels removed.

Referring now more particularly to the drawings, wherein like numerals of reference designate similar parts in each of the figures, the numeral 1 designates the axle having the spindles 2, 2, to receive the ground wheels, 3, 3, in the usual manner.

Mounted on the axle adjacent the outer ends thereof, are the pairs of spring seats 4, 4, and supported in each pair of seats, are the coil springs 5, 5, of sufficient strength to support the required load.

The numeral 6 designates the bolster which, in the form shown, is mounted on the end blocks 7, 7, and these in turn are mounted in the channel 8. At each end of the channel, and secured thereto are the depending yokes 9, 9, having the inverted seats similar to the seats 4, and into which the upper ends of the corresponding springs 5, fit. The bolster is thus yieldingly mounted on the axle.

Secured to the top of the bolster there is the channel iron 10 which directly supports the load.

In front of the trailer, there is the coupling-pole sleeve 11 which is maintained in place by the side braces 12, 12. In the form shown, these side braces are welded at their forward ends to opposite sides of the sleeve, and they diverge rearwardly, and their rear ends are welded to the underside of the channel 8. Spaced behind the sleeve 11, there is a collar 13, and between the sleeve 11 and the collar 13, there is a clamp 14 which is contractile and whose upper ends are outwardly turned and formed with bearings to receive a suitable clamp bolt 15. The coupling-pole 16 is fitted through the sleeve 11 and the collar 13, and the clamp 14 may be fitted between said sleeve and collar and clamped by the bolt 15 tightly around the coupling pole. The collar 13 is welded to the side braces 12 and the clamp collar 14 when secured in place will securely fasten the trailer to the coupling-pole 16. A coupling pin is therefore not necessary, and holes through the coupling pole may be dispensed with and the coupling pole thus not weakened. The rear end of the coupling-pole passes also through the bearing 17 which is welded to the underside of the channel 8, and which is in alignment with the sleeve 11 and the collar 13.

Chain links 18, 18, or other flexible check devices may be connected at their lower ends, to the axle, and at their upper ends, to the channel 8.

Long bolts 18', 18' pass upwardly through the bolster assembly having heads which engage underneath the channel 8 and nuts 19 within the channel 10 which secure the bolts in place.

There are the upper and lower forwardly converging braces 20, 20, and 21, 21. The rear ends of the upper braces are fitted between the bolster 6 and the channel 10, and are secured in place by the bolts 18' which pass through them. The forward ends of the braces 20 are bolted to the lugs 21', 21', which are formed integrally with the sleeve 11.

Figure 3:
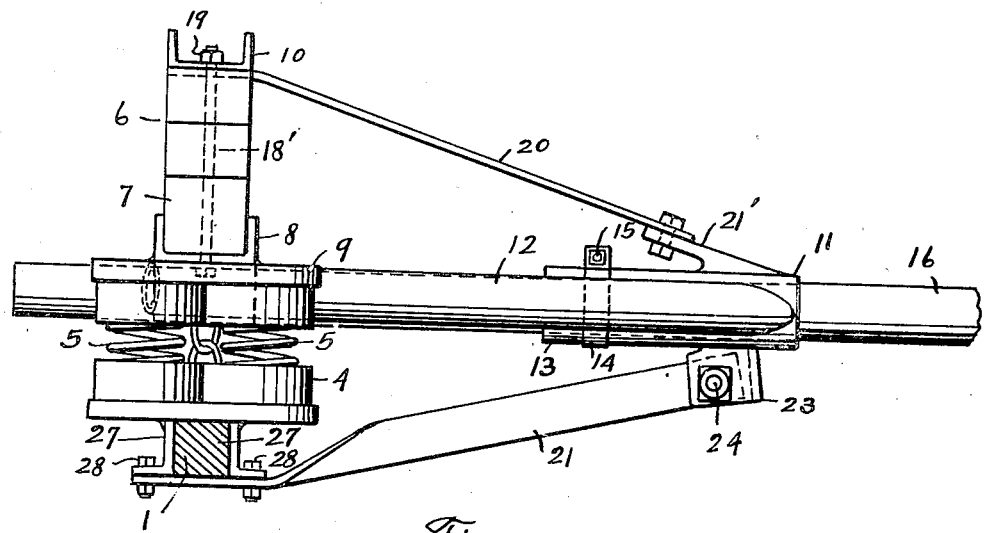
Figure 3 shows a side elevation of the trailer partly in section, taken on the line 3—3 of Figure 2, and showing the ground wheels removed.

There are the angles 27, 27, which embrace the axle 1, and whose upper ends are welded to the corresponding spring seats 4. The lower ends of these angles are outwardly turned in opposite directions, as shown in Figure 3. The rear ends of the lower braces 21, fit closely against under sides of the outwardly turned ends of the angles 27, and are bolted thereto by means of suitable bolts, as 28, 28, and the forward ends of these lower braces 21 are pivotally connected to the lug 23 on the sleeve 11 by means of a suitable transverse bolt 24 whereby the lower braces may pivot at their forward ends on a transverse axis.

The upper assembly of the trailer, therefore, is mounted on the springs 5 to move up and down, and the lower braces 21 form a connection between the upper and lower assemblies to permit this relative vertical movement, and the checks 18, 18, are provided to limit such movement.

A very compact type of trailer is thus provided, and when equipped with the springs of the type described, will not be subject to the side swinging or side swaying movement of trailers now commonly used and equipped with leaf springs, and the trailer will consequently not be so liable to turn over as trailers now commonly used.

The coupling pole 16 is connected, at its forward end, to the draft vehicle 26, in any preferred manner.

The drawings and description disclose what is now considered to be a preferred form of the invention by way of illustration only, while the broad principle of the invention will be defined by the appended claims.

What I claim is:—

1. A vehicle trailer comprising a lower assembly which includes an axle, ground wheels supporting the axle, spring seats spaced apart on the axle, angle irons embracing said axle and whose upper ends are secured to the spring seats and whose lower ends are outwardly turned, and forwardly converging side braces whose rear ends are extended underneath and are anchored to the outwardly turned ends of said angle irons; an upper assembly which includes a bolster, a coupling pole bearing, means for securing the coupling pole bearing to the bolster and yokes secured to and arranged beneath the bolster; springs mounted on said seats and supporting said yokes, a removable bolt for pivotally connecting the forward ends of said side braces to said coupling pole bearing to move about a transverse axis and detachable check devices connecting the upper and lower assemblies, whereby the upper and lower assemblies may be disconnected, said means comprising a flexible chain, one end of which is attached to the upper assembly and the other end to the lower assembly.

2. A vehicle trailer comprising an axle, ground wheels supporting the axle, spring seats spaced apart on the axle, angle irons embracing the axle and whose upper ends are joined integrally to the spring seats and whose lower ends are outwardly turned, forwardly converging side braces whose rear ends are extended underneath and bolted to said outwardly turned lower ends of said angle irons, a bolster, end blocks on which the bolster is mounted, a channel iron on the bolster and a channel iron in which said blocks are mounted, yokes secured to and depending from said last-mentioned channel iron, coil springs supported by said spring seats and supporting the yokes, a coupling pole bearing means for detachably and pivotally connecting the forward ends of the side braces to said coupling pole bearing, forwardly converging side braces whose forward ends are connected to the coupling pole bearing and whose rear ends are fitted between the bolster and the channel thereon, bolts fitted through the upper and lower channels and passing through said blocks and bolster and through the ends of said braces between the bolster and the channel thereon, side braces secured at their forward ends to opposite sides of the coupling pole bearing and at their rear ends to the lower channel, a collar secured to said side braces aligned with and spaced rearwardly from the coupling pole bearing, a coupling pole fitted through said bearing and collar and a contractile clamp between the coupling pole bearing and collar and clamped to the coupling pole.

3. A vehicle trailer comprising a lower assembly which includes an axle, ground wheels supporting the axle and forwardly converging side braces secured to the axle; an upper assembly which includes a bolster, a coupling pole bearing and means for securing the coupling pole bearing to the bolster; coil springs between the upper and lower assemblies, a check device comprising flexible chains attached to the lower assembly and detachably secured to the upper assembly, means for detachably pivoting the forward ends of said side braces to the coupling pole bearing to move about a transverse axis, said connecting means and said check devices forming the only means for preventing the separation of the upper and lower assemblies.

4. A vehicle trailer comprising a lower assembly which includes an axle, ground wheels supporting the axle, spring seats spaced apart on the axle, angle irons embracing said axle and whose upper ends are secured to the spring seats and whose lower ends are outwardly turned, and forwardly converging side braces whose rear ends are extended underneath and are anchored to the outwardly turned ends of said angle irons; an upper assembly which includes a bolster, a coupling pole bearing, means for securing the coupling pole bearing to the bolster and a yoke secured to and arranged beneath the bolster; coil springs mounted on said seats and supporting said yokes, means pivotally connecting the forward ends of said side braces to said coupling pole bearing to move about a transverse axis.

HARVY M. ROGERS.